United States Patent [19]

Papell

[11] Patent Number: 4,529,358
[45] Date of Patent: Jul. 16, 1985

[54] VORTEX GENERATING FLOW PASSAGE DESIGN FOR INCREASED FILM COOLING EFFECTIVENESS

[75] Inventor: S. Stephen Papell, Berea, Ohio

[73] Assignee: The United States of America as represented by the Administrator of the National Aeronautics and Space Administration, Washington, D.C.

[21] Appl. No.: 580,419

[22] Filed: Feb. 15, 1984

[51] Int. Cl.$^3$ ............................................. F01D 5/18
[52] U.S. Cl. .................................. 416/97 A; 415/115
[58] Field of Search .................. 165/110, DIG. 11; 415/DIG. 1, 115; 416/97 R, 97 A, 90 A; 60/785, 786, 787; 244/199, 117 A, 207

[56] References Cited

U.S. PATENT DOCUMENTS

| | | | |
|---|---|---|---|
| Re. 14,072 | 2/1916 | Harrison | 165/148 |
| 1,597,885 | 8/1926 | Harris | 165/148 |
| 2,058,057 | 10/1936 | Brunst | 165/148 |
| 3,525,486 | 8/1970 | Wimpenny | 244/199 |
| 3,606,572 | 9/1971 | Schwedland | 416/97 A |
| 3,796,258 | 3/1974 | Malhortra et al. | 165/151 |
| 4,376,004 | 3/1983 | Bratton et al. | 416/97 A |

FOREIGN PATENT DOCUMENTS

| | | | |
|---|---|---|---|
| 109703 | 8/1980 | Japan | 416/97 A |
| 1285369 | 8/1972 | United Kingdom | 416/97 A |
| 2038957 | 7/1980 | United Kingdom | 416/97 A |

*Primary Examiner*—William R. Cline
*Assistant Examiner*—John J. McGlew, Jr.
*Attorney, Agent, or Firm*—James A. Mackin; John R. Manning

[57] ABSTRACT

It is an object of the invention to provide a film cooling apparatus of increased effectiveness and efficiency. In accordance with the invention, a cooling fluid is injected into a hot flowing gas through a passageway in a wall which contains and is subject to the hot gas. The passageway is slanted in a downstream direction at an acute angle to the wall. A cusp shape is provided in the passageway to generate vortices in the injected cooling fluid thereby reducing the energy extracted from the hot gas for that purpose. The cusp shape increases both film cooling effectiveness and wall area coverage. The cusp may be at either the downstream or upstream side of the passageway, the former substantially eliminating flow separation of the cooling fluid from the wall immediately downstream of the passageway.

14 Claims, 10 Drawing Figures

VORTEX GENERATING FLOW PASSAGE DESIGN FOR INCREASED FILM COOLING EFFECTIVENESS

ORIGIN OF THE INVENTION

This invention was made by an employee of the U.S. Government and may be manufactured or used by or for the Government without the payment of any royalties thereon or therefor.

TECHNICAL FIELD

The invention relates to a method and apparatus for cooling high temperature structures with a fluid coolant such as air and is directed more particularly to a method and apparatus for establishing a layer of low temperature fluid between a hot flowing fluid and a wall subject to the hot fluid. Such cooling is known as "film cooling".

DESCRIPTION OF THE PRIOR ART

Film cooling of the surfaces of combustor walls and turbine or stator blades in gas turbine engines and jet engines is generally well-known. In such apparatus, slanted circular apertures or passageways are provided in the combustor wall or in the turbine blade wall. A coolant fluid such as air under pressure is applied to one side of a wall whereby it is injected at an acute angle to a hot flowing gas on the other side of the wall. The coolant displaces the hot flowing gas to form a layer of coolant between the wall and the hot gas.

A coolant layer for film cooling structures extends in a downstream direction from each passageway for a distance determined by the amount of mixing or blending of the coolant and the hot gas. After the coolant and the hot gas are thoroughly mixed, of course, the cooling effect is lost. Further, immediately downstream of each passageway there is normally a separation of the coolant from the wall. This results in an undesirably high temperature immediately downstream of each passageway.

At each passageway where a jet of coolant is injected into the hot flowing gas a pair of contra-rotating vortices are generated in the coolant flow by the hot crossflow. The energy to generate these vortices is provided by the hot flowing gas. Thus, there is a considerable energy loss associated with the film cooling process.

Accordingly, to obtain maximum cooling, the mixing of the coolant in the hot gas must be minimized to extend the coolant layer a maximum distance in the downstream direction. Further, separation of the coolant gas from the wall to be cooled must be minimized or eliminated immediately downstream of each passageway. Additionally, reduction of the energy extracted from the hot flowing gas to effect film cooling is highly desirable. This makes more energy available to turn the coolant jet closer to the wall.

Exemplary patents which disclose film cooling structures are as follows:

U.S. Pat. No. 4,384,823 to Graham et al teaches that the effectiveness of film cooling is improved by injecting into a hot flowing gas a coolant the flow of which has been changed through an angle substantially greater than 90°. This results in delayed mixing of the coolant with the hot gas.

U.S. Pat. No. 3,742,706 to Klompas discloses turbine blading in which a portion of the high pressure compressor discharge airflow is directed to cool the most critical temperature areas of a turbine blade and a portion of the low pressure compressor interstage airflow is directed to cool the less critical temperature areas of the same turbine blade.

U.S. Pat. No. 3,437,313 to Moore discloses a gas turbine in which the air delivered to a turbine rotor disc for delivery to cooling passages in the turbine blades is at a higher pressure than the gas passing over and driving the turbine blades. In the structure, a projection extends into the gas flow and uses some of the dynamic pressure head of the gas flow to resist the escape of cooling air into the gas flow.

U.S. Pat. No. 3,542,486 to Kercher discloses a turbine blade having a common plenum chamber and including a plurality of passageways, the passageways in the low pressure portion of the external surface of the turbine blade being of non-uniform cross-section in that portion of the passageway is of a substantially different diameter than the remainder of the passageway.

U.S. Pat. No. 3,781,129 to Aspinwall discloses a hollow air cooled turbine blade having two cooling air exhaust tubes disposed near the interior of the leading edge of the blade, these tubes define between them a slot nozzle causing air to impinge on and cool the blade leading edge.

U.S. Pat. No. 4,127,988 to Becker discloses a gas turbine rotor having two different airflow paths, one of which provides low velocity air to the axial region of the rotor and the other directing high velocity cooling air into a radially outwardly disposed region of the rotor.

U.S. Pat. No. 3,891,348 to Auxier discloses an air cooled turbine blade having a plurality of longitudinal cavities is provided with cooling air inlets at its base. Each cavity provides film cooling for a different area of the turbine blade.

U.S. Pat. No. 4,017,207 to Bell et al discloses air flow control apparatus for a gas turbine in which the turbine wall is surrounded by a chamber divided into inlet and outlet regions by a partition having spaced apart portions projecting toward the wall. Air jets immerge from nozzle openings in the free ends of the projections. Air rebounding from the wall enters the spaces between the projections and consequently does not interfere with the flow of fresh air, thereby raising the efficiency of the heat exchange.

DISCLOSURE OF THE INVENTION

It is an object of the invention to provide effective film cooling of a surface with substantially less expenditure of energy than prior art methods.

It is another object of the invention to reduce or eliminate separation of the cooling film from the wall to be cooled immediately downstream of each coolant injection passageway. An overall object of the invention is to increase film cooling coverage and effectiveness.

In accordance with the invention, a wall to be protected from a hot flowig gas is provided with passageways which are slanted in a downstream direction. In cross section, each of the passageways has a cusp portion whereby the coolant injected into the hot flowing gas is in the form of a coolant jet including a pair of contra-rotating vortices. The cusp portions of the passageways may be either on the upstream or downstream side with the latter being particularly effective in minimizing separation of a cooling film from the wall immediately downstream of each of the passageways.

BRIEF DESCRIPTION OF THE DRAWINGS

The details of the invention will be described in connection with the accompanying drawing, in which.

DETAILED DESCRIPTION OF THE INVENTION

Figure 1:
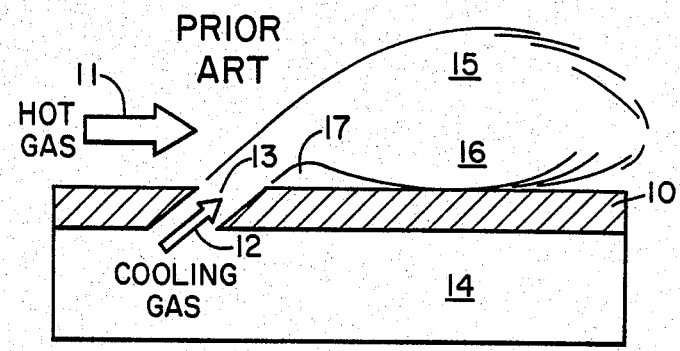
FIG. 1 is a longitudinal schematic of a prior art film cooled wall.

Referring now to FIG. 1, there is shown a wall 10 which is to be protected from a hot flowing gas represented by arrow 11. Arrow 12 represents a jet of cooling fluid such as air, the cooling fluid being injected into the hot flowing gas 11 from a plenum 14. The hot gas and the cooling gas blend or mix in the area 15 while in the region of 16 the cooling gas contacts the wall 10 to effect cooling thereof. An undesirable separation of the cooling gas from wall 10 occurs in the area 17 immediately downstream of a cooling passageway 13 which is of generally circular cross-section.

Figure 2:
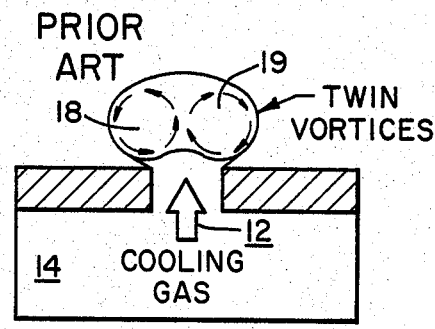
FIG. 2 is a transverse schematic view of a prior art film cooled wall.

FIG. 2 illustrates how a jet of cooling gas represented by arrow 12 interacts with a stream of hot flowing gas to form twin vortices 18 and 19. This interaction consumes a portion of the energy in the hot gas.

Figure 3:
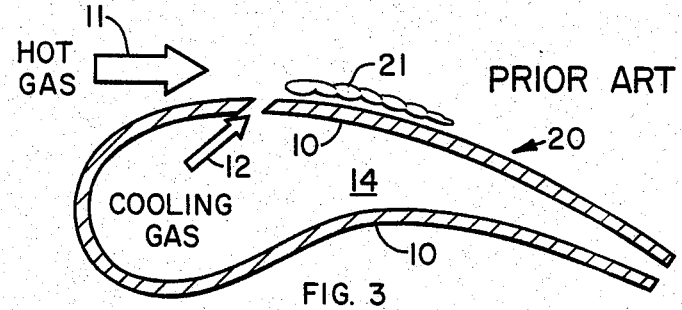
FIG. 3 is a transverse sectional view of a prior art film cooled turbine blade.

There is shown in FIG. 3 a hollow turbine blade wherein the interior serves as a plenum chamber 14. A jet of cooling gas 12 forms a coolant layer 21 which protects wall 10 of the turbine blade 20 from the hot gas 11.

Figure 4:
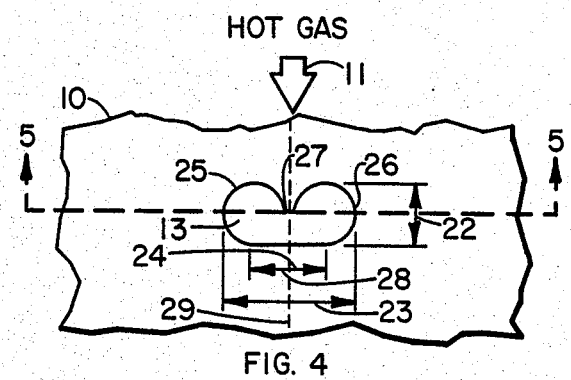
FIG. 4 is a plan view of a cooling passageway embodying the invention.

Referring now to FIG. 4, there is shown in the wall 10 over which flows a hot gas 11 a passageway 13 configured in accordance with the invention. Passageway 13 has a height and width represented by double-ended arrows 22 and 23, respectively. As viewed in FIG. 4, passageway 13 is defined by a flat surface 24 which is contiguous with curved sidewall surfaces 25 and 26 which intersect to form a pointed member of cusp 27. By definition, a cusp is a pointed projection formed by or arising from the intersection of two arcs or foils.

The pointed member 27 together with the arcs or curves 25 and 26 are considered as the cusp portion of the passageway 13 which has a flat surface 24 opposite the cusp. The flat surface 24 has a width delineated by the double ended arrow 28, which width is preferably less than the width 23 of passageway 13. As shown, pointed member 27 may have its point blunted to preempt the inevitable progressive erosion which would occur to the point.

The curved surfaces 25 and 26, as shown, have a constant curvature, that is, as portions of circles they have constant radii. It will be understood that this is not a requirement of the invention. Thus, the curvature of surfaces 25 and 26 may decrease in a downstream direction, that is, in the direction of the hot flowing gas 11. The cusp portions 25, 26 and 27 are symmetrical to a plane perpendicular to the wall 10 and parallel to the flowing gas 11 and lying along the line 29.

Figure 5:
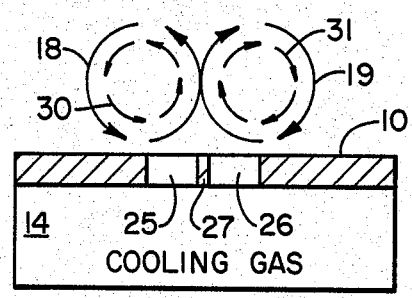
FIG. 5 is a transverse section taken along the line 5—5 of FIG. 4.

FIG. 5 which is a transverse sectional view taken along the line 5—5 of FIG. 4 shows vortices 18 and 19 generated by hot gas as illustrated in FIG. 2 with regard to the prior art. However, due to the cusp-shaped portion of the passageway 13, as shown in FIG. 4, vortices 30 and 31 are formed in the cooling gas injected into the hot flowing gas through passageway 13 by flow passage geometry. Because of the vortices 30 and 31 developed in the injected jet of cooling gas, less energy is extracted from the hot flowing gas to establish vortices of a specific magnitude.

It should be noted in FIG. 5 that vortices 30 and 31 rotate in the same direction as their associated vortices 18 and 19, respectively, but are contra-rotating with respect to each other. This is because the cusp portion 25, 26 and 27 of passageway 13 is upstream of the flat surface 24 with respect to the direction of flow of the hot gas 11. The configuration shown in FIG. 4 will be referred to as a top cusp.

Figure 6:
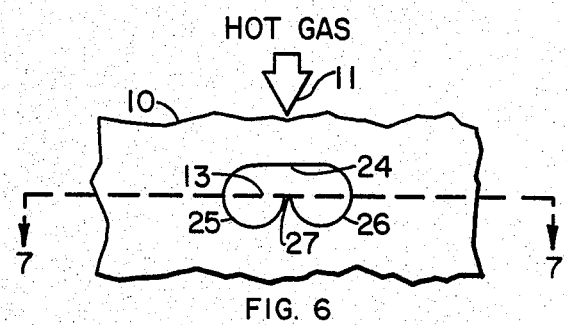
FIG. 6 is a plan view of a coolant passageway having a preferred configuration in accordance with the invention.

As compared to FIG. 4, a bottom cusp for passageway 13 is shown in FIG. 6. The passageway 13 of FIG. 6 is simply reversed from that shown in FIG. 4 so that the cusp portions 25, 26 and 27 are at the downstream side of passageway 13.

Figure 7:
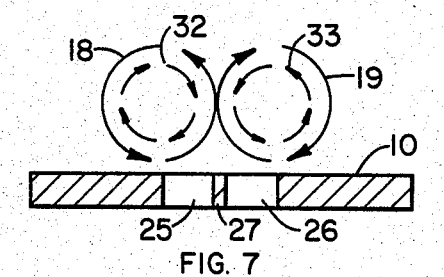
FIG. 7 is a transverse sectional view taken along the line 7—7 of FIG. 6.

FIG. 7, which is a view taken along the line 7—7 of FIG. 6, illustrates the result of using a bottom cusp configuration for the cooling passage 13. The arrows representing the vortices 18 and 19 are similar to the prior art vortices 18 and 19 shown in FIG. 2. However, the vortices produced in the jet of injected cooling fluid or gas, because of the cusp configuration of the cooling passageway, rotate in directions opposite to their associated vortices 18 and 19, as illustrated by the arrows 32 and 33, respectively. The effect is to increase film cooling immediately downstream of the passageway 13 by preventing or minimizing flow separation of the cooling gas from the wall 10.

Figure 8:
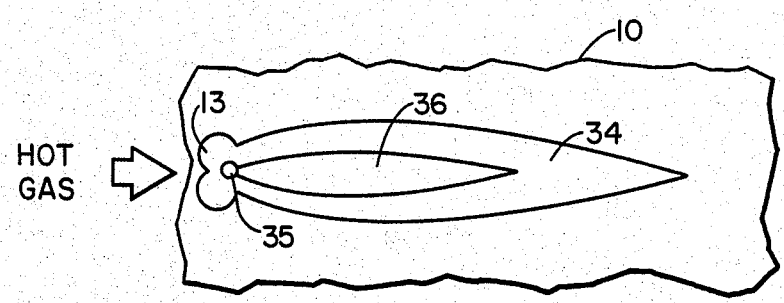
FIG. 8 is a schematic plan view illustrating the coolant coverage area of two different shaped passageways with the same flow areas.

FIG. 8 is a schematic plan view illustrating the increased surface area of cooling effected by using a top cusp passageway, as compared to the prior art circular passageway. The cusp shaped passageway 13 provides cooling for an area 34 for the wall 10. By contrast, a circular passageway 35 of the same flow area provides cooling for a much smaller surface area 36. It will be understood that FIG. 8 is illustrative only and the passageways 13 and 35 as well as the cooled areas 34 and 36 are not drawn to any particular scale.

Figure 9:
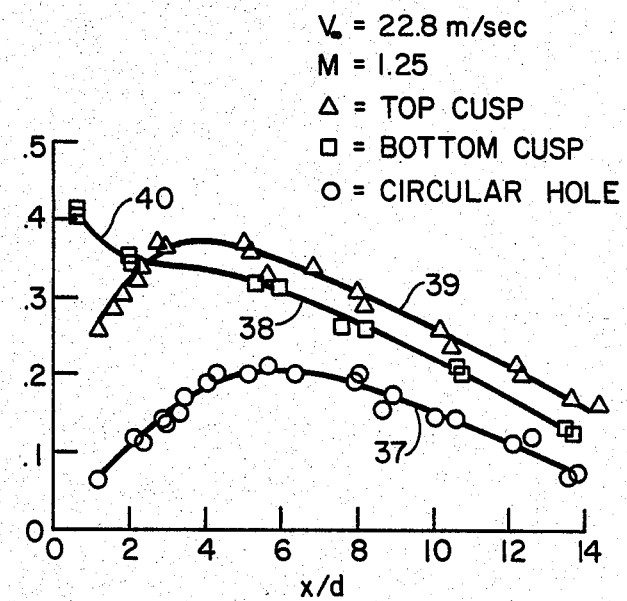
FIG. 9 is a graph comparing the film cooling effectiveness of prior art circular cross section passageways and those configured in accordance with the invention all having equal flow areas.

With respect to FIGS. 9 and 10, parameters utilized in obtaining the data for those figures are as follows:

$T_\infty$—Hot Gas Temp
$T_w$—Wall Temp Exposed To Hot Gas
$T_c$—Coolant Temp $\eta$—Film Cooling Efficiency = $T_\infty - T_w/T_\infty - T_c$
M—Blowing Rate = $(\rho V)_c/(\rho V)_{28}$
$V_\infty$—Hot Gas Velocity
$V_c$—Coolant Jet Velocity
$\rho$—Density
x—Distance Downstream From Edge of Hole
d—Diameter of Round Hole
A—Area of Wall Enclosed by an Isotherm Referring now to FIG. 9, graphs of relative centerline film cooling effectiveness for a circular hole, a bottom cusp, and a top cusp with same flow areas are plotted for the ratio x/d, where x is the distance downstream from the edge of the passageway and d is the diameter of a round passageway. From the graph, it will be seen that the film cooling effectiveness of both the top cusp and the bottom cusp is significantly greater than that for the circular passageway.

It is important to note that below an x/d ratio of 4, the film cooling effectiveness of the top cusp and the circular passageway both decrease, while that for the bottom cusp begins to increase. Below an x/d ratio of approximately 2.5 the film cooling effectiveness of the bottom cusp increases drastically, as indicated by the portion 40 of curve 38. This is due to the substantial elimination of flow separation of the cooling fluid from the wall immediately downstream of each passageway.

Figure 10:
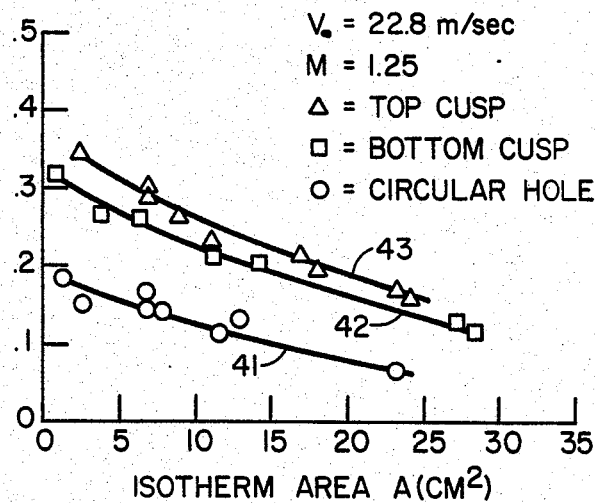
FIG. 10 is a film cooling coverage graph comparing coolant passgeways configured in accordance with the invention to prior art circular cross section passageways, all being equal in flow area.

In FIG. 10, curves 41, 42 and 43 are plotted for relative film cooling coverage vs. isotherm area for a circular passageway, a bottom cusp and a top cusp, respectively, with same flow areas. As shown, both the bottom cusp and the top cusp are significantly better than the circular passageway with respect to the area cooled.

The graphs of FIGS. 9 and 10 were derived at a blowing rate M=1.25. The cooling passageways configured in accordance with the invention have been proven operative for any blowing rate from 0.2 to 2.1 which is the range normally used for film cooling of turbine blades and combustor walls. However, the invention is operative over any blowing rate attainable by presently known cooling fluids and hot gases and as defined by M on page 7.

From the foregoing, it will be seen that a film cooling passageway, a portion of which in cross-section is shaped as a cusp, provides increased film cooling effectiveness. Additionally, if the cusp is on the downstream side of the passageway with respect to the hot flowing gas from which a wall is to be protected, separation of the cooling fluid from the wall immediately downstream of the passageway is substantially eliminated. It will be understood that changes and modifications may be made to the above described invention without departing from its spirit and scope, as set forth in the claims appended hereto.

I claim:

1. A wall separating a hot gas flowing in a first direction and a cooling gas which is to be injected into the hot flowing gas to form a cooling film between the hot gas and the wall, said wall including at least one passageway slanting in the first direction at an acute angle to the wall, said at least one passageway having a cusp body therein coplanar with the wall to be protected from the hot gas, said cusp being symmetrical to a centerline generally parallel to the first direction of the hot flowing gas, said coolant gas being injected into said hot gas at a blowing rate of from 0.2 to 2.1.

2. The structure of claim 1 wherein said at least one passageway is of generally circular cross section except for said cusp body.

3. The structure of claim 1 wherein said cusp body is approximately equal in length to said at least one passageway.

4. The structure of claim 1 wherein said cusp is a top cusp.

5. The structure of claim 1 wherein said cusp is a botton cusp.

6. The structure of claim 1 wherein said passageway includes a flat surface opposite said cusp.

7. The structure of claim 6 wherein the arcs forming said cusp are contiguous with said flat surface.

8. The structure of claim 7 wherein said cusp is at least half the height of said passageway and is blunted.

9. In a film cooling apparatus of the type wherein a coolant gas is injected through a wall into a flowing hot gas contained by the wall to provide a film of coolant between the hot gas and the wall, the improvement comprising at least one passageway having a coolant entrance end and a coolant exit end and extending through the wall slanted at an acute angle thereto in a downstream direction and defined by a height and width, the wall including a pointed member coplanar with the wall and extending into the passageway along line parallel to the direction of flow of the hot gas, said pointed member having curved edges and being symmetrical to said line; a coolant gas source; and, means for directing coolant gas from the coolant gas source to the coolant entrance end of the passageway whereby the wall downstream of the coolant exit end of the passageway is protected from the hot gas.

10. The apparatus of claim 9 wherein said pointed member extends at least half the height of said passageway.

11. The apparatus of claim 9 wherein said pointed member is in the form of a ridge substantially equal in length to the thickness of the wall.

12. The apparatus of claim 11 wherein said pointed member extends in an upstream direction.

13. The apparatus of claim 11 wherein said pointed member extends in a downstream direction.

14. The apparatus of claim 9 wherein said pointed member is blunted.

* * * * *